United States Patent Office 3,531,521
Patented Sept. 29, 1970

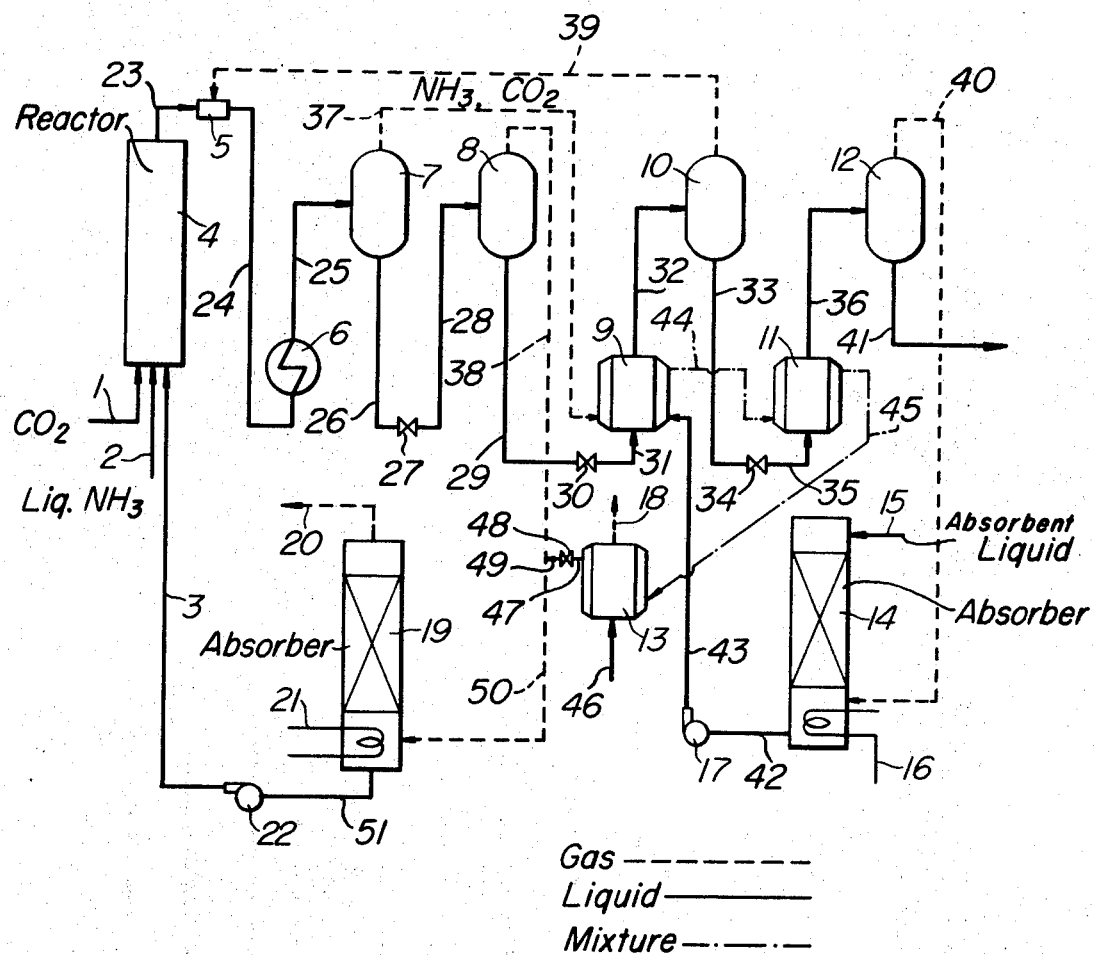

3,531,521
METHOD FOR SYNTHESIS OF UREA
Nobuo Zen, Toshio Ozu, Takao Okano, and Yutaka Goda, Niihama-shi, Japan, assignors to Sumitomo Chemical Company, Ltd., Higashi-ku, Osaka, Japan, a corporation of Japan
Filed Feb. 9, 1967, Ser. No. 614,847
Claims priority, application Japan, Feb. 15, 1966, 41/9,013
Int. Cl. C07c *127/00*
U.S. Cl. 260—555         1 Claim

ABSTRACT OF THE DISCLOSURE

An improved process for producing urea from ammonia and carbon dioxide in which urea synthetic process reaction product is pressure-decreased by use of ejector and the unconverted gaseous raw materials are separated in multi-stage decomposition steps from the reaction product, among which the separated gas of the second stage is recycled into ejector, whereby together with the separated gas of the first stage the separated gas of the second stage is absorbed in absorbing liquid at a higher temperature and pressure and the heat generated by the absorbing is utilized in the decomposition of ammonium carbamate, and the amount of the unconverted gaseous raw materials to be separated and absorbed at a low pressure stage is decreased by the recycle of the separated gas of the second stage into the ejector.

---

This invention relates to a method for the recovery of heat energy and the recycle of the unconverted starting materials in the synthesis of urea from ammonia and carbon dioxide.

Urea is synthesized by the reaction of ammonia with carbon dioxide under a pressure of 100–300 atm. at a temperature of 170°–200° C. In view of the equilibrium of the urea synthesis reaction, the conversion to urea is ordinarily about 50–80% based on the starting carbon dioxide.

The reaction proceeds according to the following equations:

(1)     $2NH_3 + CO_2 \rightarrow NH_2COONH_4$ 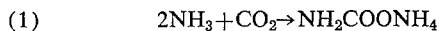

(2)     $NH_2COONH_4 \rightarrow NH_2CONH_2 (urea) + H_2O$ 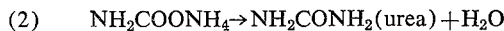

Equation 1 shows the formation of the intermediate compound ammonium carbamate. This is rapid exothermic reaction, and goes readily to completion. However, the reaction of Equation 2 is a relatively slow endothermic reaction under ordinary treating conditions and does not readily go to completion in practice. One commercial scale process utilizes a large excess of ammonia, and produces relatively high conversion of carbamate to urea. Further, in order to increase the conversion, it is necessary to minimize as far as possible the amount of water fed to the urea synthesis step. This is because the reaction of Equation 2 is an equilibrium type dehydration reaction which gives a product containing water as one component, and the presence of a major proportion of water lowers the conversion to urea.

There has been a process, in which the reaction product from the high pressure synthesis step is ordinarily heated at 1 to 3 stages while successively reducing the pressure, and ammonium carbamate contained therein is decomposed into ammonia and carbon dioxide and is transferred to the gas phase together with unreacted ammonia. These gases are then absorbed in an absorption liquid and are returned to the synthesis step to reuse for the urea synthesis. In case ammonia has been used in excess in the above process, there is also adopted such a procedure that excess ammonia is condensed after separation by rectification and is recovered and reused as liquid ammonia.

According to the above-mentioned process, a large amount of steam is required in the heat treatment for decomposing ammonium carbamate to transfer the resulting ammonia and carbon dioxide to the gas phase together with unreacted ammonia. Further, the above process requires a large amount of cooling water for absorbing the absorption heat generated in absorbing in an absorption liquid the components transferred to the gas phase.

In order to overcome the above drawbacks, there have been proposed processes (for example, Japanese patent publication Nos. 8,263/62 and 7,620/63) in which the absorption of ammonia and carbon dioxide into an absorption liquid is effected under a relatively high pressure to elevate the absorption temperature, and the heat generated in this case is utilized as a heat source for the decomposition of ammonium carbamate under a low pressure. In order to increase only the amount of heat recovered, the amount of heat of separated gas to be absorbed in an absorption liquid may be made as close as possible to the amount of heat required for the latter stage low pressure decomposition step, while maintaining as high as possible the pressure of the before stage medium pressure decomposition step. However, this results in that the decomposition ratio of ammonium carbamate under medium pressure, which ordinarily is about 70–80%, is lowered to about 50–70%, and further the pressure of the low pressure decomposition step is lowered as far as possible.

Further, when the above operation is adopted, the amount of gas component under low pressure is increased and the amount of the absorption liquid (chiefly water) employed to absorb said gas becomes greater, with the result that the amount of water returned to the synthesis step is increased to lower the conversion to urea. Thus, in the urea synthesis industry, to maintain the amount of recovered heat at a high level and to minimize the amount of low pressure separated gas to be subjected to the low pressure absorption step are in a relationship contrary to each other. In the process of Japanese patent publication No. 8,263/62, the heat treatment of ammonium carbamate is effected under 200–400 p.s.i.g. in the first stage decomposition and under below 50 p.s.i.g. in the second stage decomposition. According to the above process, however, the above-mentioned problem has not sufficiently been solved. Further, in the process of Japanese patent publication No. 7,620/63, there is provided before the medium pressure decomposition still operated under 15–25 kg./cm.² gauge a decomposition still operated under more than 1.3 times the pressure of said medium pressure still, so that the amount of recovered heat can be made greater, and the operation is effected so that 20–40% by weight based on the weight of all the unconverted starting materials may be contained in the low pressure separated gas. In this process, however, steam is used as a heat source for the medium pressure decomposition and the amount of steam employed is about 1.3–1.4 tons per ton of urea.

An object of the present invention is to provide a method for synthesizing urea from ammonia and carbon dioxide in which to make as high as possible the pressure of the initial stage decomposition of ammonium carbamate contained in the reaction product thereby maintaining the recovery of heat at a high level, and to minimize the amount of low pressure-separated gas to be subjected to absorption treatment in a low pressure absorption step thereby decreasing the amount of water introduced into the synthesis step to a small amount are achieved in connection with ejector effects.

The present invention provides a method for synthesizing urea by reacting ammonia with carbon dioxide at elevated temperature and pressure, which comprises reducing in an ejector type pressure-lowering portion the pressure of the reaction product from the urea synthesis step to 25–50 kg./cm.$^2$ gauge, subjecting said reaction product to thermal treatment in a first stage decomposition step, separating a generated gas from the reaction product, thermally treating the reaction product in a second stage decomposition step under a pressure of 5–15 kg./cm.$^2$ gauge, separating a generated gas from the reaction product, thermally treating the reaction product in a third stage decomposition step maintained under a pressure of atmospheric to 3 kg./cm.$^2$ gauge, and further separating a generated gas, while absorbing the separated gas obtained from the first decomposition step under the pressure of said step in an aqueous solution obtained by absorbing in an aqueous absorption liquid the separated gas obtained from the third stage decomposition step, utilizing the absorption heat generated in said absorption of the separated gas obtained from the first stage decomposition step as a heat source for the second stage decomposition step and then as a heat source for the third stage decomposition step, introducing a gas-liquid mixture formed in said absorption in the medium pressure absorption step to be subjected to absorption treatment, reusing the resulting aqueous ammonium carbamate solution for urea synthesis, and returning the gas separated through the second stage decomposition step to the ejector type pressure-lowering portion.

Another method of the present invention is carried out according to the above method in which the reaction product after separation from the gas generated under a pressure of 25–50 kg./cm.$^2$ gauge in the first stage decomposition step is further reduced in pressure to 15–25 kg./cm.$^2$ gauge, a gas generated is separated and is introduced into the medium pressure absorption step, and the reaction product is further introduced into the step subsequent to the first stage decomposition step and is treated in the same manner as in the above method.

As mentioned above, in the present method, the first stage pressure reduction of the reaction product from the urea synthesis step is effected by use of an ejector type pressure lowering means. Therefore, the gas generated in the second stage decomposition step can be readily elevated in pressure by incorporating it into the high pressure reaction product stream through said ejector type pressure lowering means, and can be absorbed together with the gas from the first stage decomposition step into an aqueous solution under elevated pressure and temperature conditions, whereby heat recovery is maintained at a high level. At the same time, the absorption heat generated in the above case is effectively utilized for the decomposition of the unconverted ammonium carbamate with the result that the amount of steam employed may be saved to less than 1 ton per ton of urea.

In the total recycle type urea production process, it is desired for the enhancement of the conversion to urea that the amount of water in the aqueous ammonium carbamate solution to be recycled be minimized as far as possible. In the present method, however, heat recovery is effected by use of an ejector type pressure-lowering means and therefore, even when the pressure of the first stage decomposition step is elevated, the amount of the low pressure separated gas sent to the low pressure absorption step can be decreased to a small amount.

According to the present method, therefore, the amount of water in the aqueous ammonium carbamate solution can be decreased to a minimum limit and thus lowering of the conversion to urea can be kept to minimum limit.

FIG. 1 is a flow sheet for the illustration of the method of the present invention.

An embodiment of the present method when carried out using a commercial scale apparatus will be illustrated below with reference to FIG. 1.

Carbon dioxide and liquid ammonia are fed through lines 1 and 2, respectively, to a high pressure synthesis column 4 maintained under a pressure of 100–300 kg./cm.$^2$ gauge and at a temperature of 170–200° C. The molar ratio of ammonia to carbon dioxide is within the range of 2 to 5. The reaction product taken out of the high pressure synthesis column 4 through a line 23, which contains urea, ammonia, water and ammonium carbamate, is lowered in pressure to 25–50 kg./cm.$^2$ gauge, preferably to 25–35 kg./cm.$^2$ gauge, in an ejector type pressure-lowering portion 5 and is introduced through a line 24 into a first decomposer 6. The first stage pressure reduction treatment is effected so that the pressure of the reaction product becomes about 25–50 kg./cm.$^2$ gauge, in order that large quantities of carbon dioxide and ammonia separated at a high temperature are absorbed into a solution obtained in a low pressure absorption step to generate a large amount of heat and the heat thus generated is effectively utilized as a heat source for the subsequent decomposition step. The ejector type pressure-lowering portion 5 is effectively operated so that the reaction product from the urea synthesis step is subjected to the first pressure reduction treatment to attain the above-mentioned pressure and that the gas separated in the decomposition step mentioned later is returned and is elevated in pressure utilizing the energy at the time of pressure lowering. The first decomposer 6 is heated with steam and, in the decomposer, the reaction product is heated to and maintained at 140°–160° C. and the decomposition of ammonium carbamate contained in the reaction product and the vaporization of unreacted ammonia are effected. The reaction product is then introduced through a line 25 into a gas-liquid separator 7, in which the gas component generated after the first stage decomposition treatment is separated through a line 37. Subsequently, the reaction product is withdrawn through a line 26, is reduced in pressure to 15–25 kg./cm.$^2$ gauge by means of a valve 27, and is then introduced through a line 28 into a gas-liquid separator 8, in which the gas component generated is separated through a line 38. Thereafter, the reaction product is taken out through a line 29, is reduced in pressure to 5–15 kg./cm.$^2$ gauge, preferably to 7–10 kg./cm.$^2$ gauge by means of a valve 30, and is then introduced through a line 31 into the tube of a second decomposer 9. In this case, the gas-liquid separator 8 may be omitted and the pressure of the reaction product withdrawn from the separator 7 may be reduced directly to 5–15 kg./cm.$^2$ gauge. In the second decomposer 9, the reaction product is heated to and maintained at 120°–140° C., whereby the ammonium carbamate is further decomposed. The reaction product is then introduced through a line 32 into a gas-liquid separator 10, in which the generated gas component is separated through a line 39. Subsequently, the reaction product is withdrawn through line 33, is reduced in pressure to atmospheric to 3 kg./cm.² gauge by means of a valve 34, is introduced through line 35 into the tube of a third decomposer 11 and is heated to and maintained at 100°–125° C. According to this heat treatment, substantially all of the residual ammonium carbamate is decomposed. The reaction product is introduced through a line 36 into a gas-liquid separator 12 and a gas generated is separated through a line 40. According to such operations as above, more than 80% of ammonia and carbon dioxide, which have not been converted into urea, are separated by means of the gas-liquid separators 7 and 8. Therefore, the amount of the gas separated by means of the gas-liquid separator 12 is as small as less than 20% of the unconverted ammonia and carbon dioxide, whereby the amount of water to be returned to the urea synthesis column can be kept at a small amount. The reaction product, from which the residual gas component has been separated, is fed through a line 41 to the step of making urea into product.

On the other hand, the gas separated in the gas-liquid separator 7 is directly fed through a line 37 to the exterior of the tube of the second decomposer 9. At the same time, an aqueoous solution formed in a low pressure absorption column 14 is introduced through a line 42, a pump 17, and a line 43 into the exterior of the tube of the second decomposer 9. Therfore, the gas generated in the first decomposer 6 is contacted with and absorbed in the absorption liquid under the pressure in the exterior of the tube of the second decomposer 9. The absorption heat generated in this case is effectively utilized as such as a heat source for the heat treatment of the reaction product flowing through the interior of the tube of the second decomposer 9. In the above case, the second decomposition is effected under a relatively low pressure of 5–15 kg./cm.² gauge, and therefore the decomposition of ammonium carbamate is effected more easily with the result that the absorption heat is utilized more effectively. Further, the second decomposer 9 is operated under a pressure somewhat higher than that of the third decomposer 11, whereby the gas separated in the gas-liquid separator 10 is more effectively returned to the ejector type pressure-lowering portion.

In the low pressure absorption column 14, a gas separated under a low pressure through a line 40 is absorbed in an absorption liquid fed through a line 15, but the absorption heat generated in this case is controlled by means of a cooler 16. In the above case, the absorption liquid employed is aqueous and is ordinarily water. However, there may be used any of ammonia water, aqueous ammonium carbonate solution or aqueous ammonium carbamate solution, or aqueous urea solution. Even when any of the above solutions is used, the conversion to urea is scarcely affected since the amount of the gas from the gas-liquid separator 12 is small.

The gas-liquid mixture withdrawn through a line 44 from the exterior of the pipe of the second decomposer 9 is successively introduced into the exterior of the tube of the third decomposer 11 in which the contact and absorption of gas and liquid are further effected. The absorption heat generated in this case is utilized as a heat source for the decomposition of ammonium carbamate contained in the reaction product flowing through the interior of the tube of the decomposer 11. The gas-liquid mixture withdrawn from the exterior of the tube of the third decomposer 11 is introduced through a line 45 into a heat exchanger 13, and the residual heat thereof is contributed to the generation of a low pressure steam. In this case, water is introduced from a line 46 and the low pressure steam is taken out through a line 18. Subsequently, the gas-liquid mixture is introduced into a medium pressure absorption column 19 through a line 47, a valve 48 and lines 49 and 50. In the above case, if a medium pressure separated gas is obtained from the gas-liquid separator 8, said gas is introduced through lines 38 and 50 into the medium pressure absorption column 19. Alternatively, the medium pressure separated gas may be introduced into the medium pressure absorption column 19 separately from the gas-liquid mixture introduced through the line 49. The gas-liquid mixture is maintained at 80°–130° C. while being cooled by means of a cooler 21 under a pressure of 15–50 kg./cm.² gauge, whereby the contact and absorption of gas and liquid are effected and ammonium carbamate is completely absorbed to form an aqueous solution. The aqueous ammonium carbamate solution is returned through a line 51, a pump 22 and the line 3 to the high pressure synthesis column 4 and is reused for the urea synthesis.

On the other hand, from the top of the medium pressure absorption column 19, excess ammonia is separated through a line 20 and is then reused after condensation and liquefaction. The gas separated in the gas-liquid separator 10 is returned as such, without being subjected to pressure operation, to the ejector type pressure-lowering portion through the line 39, is incorporated into the reaction product from the urea synthesis step, and is subjected to medium pressure separation treatment and medium pressure absorption treatment.

In the above, the method of the present invention has been illustrated with reference to the steps shown in the accompanying drawing. However, the present method is not limited only to the steps indicated in the drawing, and various modifications thereof are also possible. For example, the present method can be effected without using the gas-liquid separator 8 shown in the flow sheet. In this case, the reaction product from the gas-liquid separator 7 is reduced in pressure to 5–15 kg./cm.² gauge, and is then introduced directly into the tube of the second decomposer 9 to be subjected to heat treatment and to subsequent treatments. Therefore, the amount of gas separated in the gas-liquid separator 10 is increased, but the gas-liquid mixture is returned as such, without being subjected to pressure treatment, to the ejector type pressure-lowering portion, is incorporated in the reaction product from the urea synthesis step and is subjected to subsequent treatments, as mentioned above. Accordingly, the increase in amount of the gas separated in the gas-liquid separator 10 does not affect the amount of gas separated in the gas-liquid separator 12. Further, the provision of the heat exchanger 13 is not always required, and the gas-liquid mixture withdrawn through the line 45 from the exterior of the tube of the third decomposer 11 may be introduced directly into the medium pressure absorption column 19. The above procedures should be carried out so as to conform to heat balance and actual operations.

The following examples illustrate the present invention but should not be construed as limiting the scope of the invention.

EXAMPLE 1

To the synthesis column 4 were fed through lines 1, 2 and 3, respectively, 741 kg./h. of carbon dioxide, 1,324 kg./h. of ammonia and 1,037 kg./h. of an aqueous ammonium carbamate solution ($CO_2$: 385 parts by weight, $NH_3$: 416 parts by weight water: 236 parts by weight). The synthesis column was operated under a pressure of 230 kg./cm.² gauge and at a temperature of 190° C. The reaction product was reduced in pressure to 33 kg./cm.² gauge in the ejector 5 and was fed to the first decomposer 6 in which a reaction product stream was maintained at a temperature of 150° C. by steam heating. In this case, 128 kg./h of a separated gas ($CO_2$: 23% by weight. $NH_3$: 70% by weight, steam: 7% by weight) from the gas-liquid separator 10 was returned to the ejector 5.

After discharging the generated gas by means of the gas-liquid separator 7, the reaction product was reduced in pressure to 20 kg./cm.² gauge, was sent to the gas-liquid separator 8, was then reduced in pressure to 10 kg./cm.² gauge and was introduced into the tube of the second decomposer 9. On the other hand, into the heating side (the exterior of the tube) of the second decomposer 9 was introduced 1,341 kg./h. of a separated gas ($CO_2$: 295 parts by weight, $NH_3$: 974 parts by weight steam: 72 parts by weight) from the gas-liquid separator 7. At the same time, was fed to said heating side of the second decomposer 9, 297 kg./hr. of an aqueous ammonium carbonate solution formed in the low pressure absorption column 14 by absorbing, in 10 kg./h. of water, 287 kg./h. of a separated gas ($CO_3$: 51 parts by weight, $NH_3$: 91 parts by weight, steam: 145 parts by weight) from the gas-liquid separator 12.

The temperature of reaction product stream in the second decomposer 9 was maintained at 125° C. The gas-liquid mixture obtained from the exterior of the tube of the second decomposer 9 was composed of an aqueous ammonium carbamate solution, carbon dioxide, ammonia gas and steam. This gas-liquid mixture was fed to the heating side (the exterior of the tube) of the third decomposer 11 to maintain the temperature of reaction product stream at 112° C. Thereafter, the gas-liquid mixture was sent to the heat exchanger 13 to effect gas-liquid absorption while generating a low pressure steam. Subsequently, the mixture was reduced in pressure to 20 kg./cm.$^2$ gauge, was mixed with 146 kg./h. of a separated gas ($CO_2$: 39 parts by weight, $NH_3$: 93 parts by weight, steam: 9 parts by weight) from the gas-liquid separator 8, and was fed to the medium pressure absorption column 19. In this case, about 85% of unconverted starting materials in the reaction product from the synthesis column 4 were treated in the medium pressure absorption column 19. The medium pressure absorption column 19 was maintained at 95° C. and the whole amounts of carbon dioxide and steam and a part of ammonia gas fed to the absorption column 19 were absorbed to form an aqueous ammonium carbamate solution, which was then recycled through the pump 22 to the urea synthesis step. On the other hand, the reaction product from the second decomposer 9 was released in the gas-liquid separator 10 from the generated gas, was reduced in pressure to 1 kg./cm.$^2$ and was fed through the third decomposer 11 and the gas-liquid separator 12 to the step of making urea into product. In this case, 1,328 kg./h. of an aqueous urea solution at a concentration of 75.5% by weight was obtained from the bottom of the gas-liquid separator 12.

Further, from the top of the medium pressure absorption column 19, 747 kg./h. of pure ammonia was withdrawn which was then condensed and reused for urea synthesis.

According to the above steps, the amount of heating steam required to decompose unconverted ammonium carbamate in the reaction product from the urea synthesis step was only the amount employed in the first decomposer 6, and the amount of steam used for the production of 1,000 kg. of granular urea became less than 1,000 kg.

EXAMPLE 2

To the synthesis column 4, which was operated under a pressure of 230 kg./cm.$^2$ gauge and at a temperature of 190° C., were fed through lines 1, 2 and 3, respectively, 682 kg./h. of carbon dioxide, 1,059 kg./h. of ammonia and 995 kg./h. of an aqueous ammonium carbamate solution ($CO_2$: 385 parts by weight, $N_3$: 416 parts by weight water: 114 parts by weight, urea: 80 parts by weight). The reaction product was reduced in pressure to 35 kg./cm.$^2$ gauge in the ejector 5 and was introduced into the first decomposer 6. In the first decomposer 6, the temperature of the reaction product was maintained at 156° C. by steam heating. In this case, 140 kg./h. of a separated gas ($CO_2$: 40 parts by weight, $NH_3$: 95 parts by weight, steam: 5 parts by weight) from the gas-liquid separator 10 was returned to the ejector 5. After discharging the generated gas by means of the gas-liquid separator 7, the reaction product was reduced in pressure to 12 kg./cm.$^2$ gauge and was introduced directly into the second decomposer 9. Into the heating side (the exterior of the tube) of the second decomposer 9 was introduced 1,207 kg./h. of a separated gas ($CO_2$: 329 parts by weight, $NH_3$: 843 parts by weight, steam: 35 parts by weight) from the gas-liquid separator 7. At the same time, was fed to said heating side of the second decomposer 9, 315 kg./h. of an absorption liquid obtained in the low pressure absorption column 14 by absorbing, in 114 kg.%h. of a 70% aqueous urea solution, 201 kg./h. of a separated gas ($CO_3$: 56 parts by weight, $NH_3$: 100 parts by weight, steam : 45 parts by weight) from the gas-liquid separator 12. The temperature of the reaction product flowing through the interior of the tube of the second decomposer 9 was maintained at 127° C. by heating. The gas-liquid mixture obtained from the exterior of the tube of the second decomposer 9 was then introduced into the heating side (the exterior of the tube) of the third decomposer 11 to maintain at 112° C. the temperature of the reaction product flowing through the interior of the tube of said third decomposer 11. Thereafter, the mixture was sent to the heat exchanger 13 to effect gas-liquid absorption while generating a low pressure steam and was then fed to the medium pressure absorption column 19 operated under a pressure of 33 kg./cm.$^2$ gauge. In this case, about 84% by weight of unconverted starting materials in the reaction product from the synthesis column 4 was treated in the medium pressure absorption column 19. Being cooled to 110° C. in the medium pressure absorption column 19, the whole amounts of carbon dioxide and steam and a part of ammonia gas were absorbed to form a concentrated ammonium carbamate solution, which was then reused for urea synthesis through the pump 22. The reaction product from the second decomposer 9 was released in the gas-liquid separator 10 from the generated gas, was then reduced in pressure to 1 kg./cm.$^2$, and was fed through the third decomposer and the gas-liquid separator 12 to the step of making urea into product. In this case, 1,328 kg./h. of an aqueous urea solution at a concentration of 75% by weight was obtained from the bottom of the gas-liquid separator 12. Further, from the top of the medium pressure absorption column 19, 527 kg./h. of pure ammonia was withdrawn, which was then condensed and reused for urea synthesis. In the above case, the amount of steam used was less than 1,000 kg. per 1,000 kg. of granular urea.

What we claim is:

1. A method for synthesizing urea by reacting ammonia with carbon dioxide at elevated temperature and pressure, which comprises reducing the pressure of the reaction product from the urea synthesis step to 25–50 kg./cm.$^2$ gauge in an ejector type pressure-lowering portion, thermally treating the reaction product in a first stage decomposition step, separating the generated gas from the reaction product, further reducing the pressure of the reaction product to 15–25 kg./cm.$^2$ gauge to separate a generated gas in a second stage decomposition step, thermally treating the reaction product in a third stage decomposition step maintained under a pressure of 5–15 kg./cm.$^2$ gauge, separating the generated gas from the reaction product, thermally treating the reaction product in a fourth stage decomposition step under a pressure of atmospheric to 3 kg./cm.$^2$ gauge, and further separating the generated gas from the reaction product, while absorbing the separated gas obtained under a pressure of 25–50 kg./cm.$^2$ gauge in the first stage decomposition step in an aqueous solution formed by absorbing in an aqueous absorption liquid the separated gas obtained from the fourth stage decomposition step, utilizing the absorption heat generated in said absorption of the separated gas obtained from the first stage decomposition step as a heat source for the third stage decomposition step and then as a heat source for the fourth stage decomposition step, introducing the gas-liquid mixture formed in said absorption of the separated gas obtained from the first stage decomposition step and the gas separated under a pressure of 15–25 kg./cm.$^2$ gauge at the second stage decomposition step into a medium pressure absorption step of 15–50 kg./cm.² gauge and cooling the mixture to 80°–130° C., reusing the resulting aqueous ammonium carbamate solution for urea synthesis, and returning the gas separated through the third stage decomposition step to the ejector type pressure-lowering portion.

References Cited

UNITED STATES PATENTS 3,357,901  12/1967  Otsuka et al. _____ 260—555
3,090,811  5/1963  Otsuka et al. _____ 260—555
3,038,285  6/1962  Mavrovic _____ 260—555

FOREIGN PATENTS 112,968  12/1964  Czechoslovakia.

LEON ZITVER, Primary Examiner
M. W. GLYNN, Assistant Examiner